US009698497B2

(12) United States Patent
Khansa et al.

(10) Patent No.: US 9,698,497 B2
(45) Date of Patent: Jul. 4, 2017

(54) REPAIR SLEEVE

(71) Applicant: DMC Power, Inc., Gardena, CA (US)

(72) Inventors: Eyass Khansa, Long Beach, CA (US); Luis Sosa, Los Angeles, CA (US)

(73) Assignee: DMC POWER, INC., Gardena, CA (US)

( * ) Notice: Subject to any disclaimer, the term of this patent is extended or adjusted under 35 U.S.C. 154(b) by 435 days.

(21) Appl. No.: 14/023,373

(22) Filed: Sep. 10, 2013

(65) Prior Publication Data

US 2015/0068786 A1 Mar. 12, 2015

(51) Int. Cl.

*H02G 15/08* (2006.01)
*H01R 4/20* (2006.01)
*H01R 43/04* (2006.01)

(52) U.S. Cl.

CPC ............... *H01R 4/20* (2013.01); *H01R 43/04* (2013.01); *Y10T 29/49199* (2015.01)

(58) Field of Classification Search

CPC ...... H02G 15/013; H02G 15/117; H02G 7/06; H02G 7/12; H02G 3/04; H02G 3/06; H02G 15/043; H02G 15/076; H02G 15/115; H01R 13/5205; H01R 9/00; H01R 9/0509; H01R 11/11; H01R 4/023; H01R 4/22; H01R 4/021; H01R 9/0518; H01R 9/0521; H01R 9/0524; H01R 9/0527; H01R 4/20; H01R 4/06; H01R 4/56; H01R 43/04; Y10T 29/49199

USPC ........................... 174/74 R, 84, 88, 84 C, 92

See application file for complete search history.

(56) References Cited

U.S. PATENT DOCUMENTS 3,441,659 A * 4/1969 Laudig ..................... H01R 4/20 174/88 C
3,992,569 A * 11/1976 Hankins et al. ................ 174/92
4,818,824 A * 4/1989 Dixit .................... H02G 15/117 174/41
5,347,084 A * 9/1994 Roney et al. ................... 174/92
5,844,171 A * 12/1998 Fitzgerald .............. H02G 15/18 174/138 F (Continued)

OTHER PUBLICATIONS

AFL GLOBAL, Standard Compression INS-ACA020, Repair Sleeves on ACSR, AAC, AAAC and ACAR Conductors, accessed via Internet at aflglobal.com on Oct. 11, 2013, (Jul. 18, 2012), 1 page.

(Continued)

*Primary Examiner* — Pete Lee

(74) *Attorney, Agent, or Firm* — Blakely Sokoloff Taylor and Zafman; George W Hoover

(57) ABSTRACT

A repair sleeve has first and second end portions, each of which has a substantially cylindrical outer surface. The end portions are bored to receive a cable of a particular diameter. The inner surface of each end portion may be stepped or tapered. The center portion of the repair sleeve, between the two end portions, has an interior diameter substantially larger than the nominal diameter of the cable so that the repair sleeve can be use on a frayed cable or a cable with a failing splice. The repair sleeve is split longitudinally into two interlocking portions, which, when separated, allows the damaged cable or failing splice under repair to be inserted into a first one of the portions in a radial direction. The other portion is then inserted into the first portion and the repair sleeve is swaged onto the cable.

6 Claims, 5 Drawing Sheets

(56) References Cited

U.S. PATENT DOCUMENTS

| | | | | |
|---|---|---|---|---|
| 6,359,228 B1 * | 3/2002 | Strause | G02B 6/4446 174/41 |
| 8,674,230 B2 * | 3/2014 | Hoxha | H01R 11/28 174/135 |
| 2010/0206631 A1 * | 8/2010 | Peters | H01R 4/62 174/77 R |

OTHER PUBLICATIONS

Hubbell Power Systems, Inc., Fargo Repair and Maintenance for Today's Transmission Line Problems, accessed via Internet at hubbellpowersystems.com on Sep. 13, 2013, (Apr. 1997), 4 pages.

* cited by examiner

REPAIR SLEEVE

BACKGROUND OF THE INVENTION

Field of the Invention

This invention relates to the field of repair sleeves for cables, particularly electrical conductors. More particularly, the invention relates to a swaged repair sleeve having an enlarged central cavity to accommodate frayed cables or previously installed splices.

Background

Electric power transmission lines are an everyday sight throughout the world. Transmission lines connecting power generation facilities to power distribution substations are typically routed overhead. Electrical current is carried by conductors that commonly comprise multiple strands of aluminum wire, often reinforced with one or more strands of steel. Overhead power transmission lines are not covered with a layer of insulation and are therefore subject to weather and acts of vandalism, such as gunshots. Minor damage to power transmission lines can be repaired with a sleeve that spans the damaged area and is then secured to undamaged cable on either side with swaged, crimped or mechanical fittings. Commonly available repair sleeves are difficult to fit if the cable is frayed. Furthermore, commonly available repair sleeves cannot be fitted over a splice in the cable, so that, if a splice is damaged or otherwise failing, the splice must be removed and replaced with a new splice.

SUMMARY OF THE INVENTION

The present invention provides a repair sleeve for a cable, such as those used for power transmission lines, that more easily accepts frayed cable and that can be applied over a previously installed splice that is failing.

The repair sleeve has first and second end portions, each of which has a substantially cylindrical outer surface. The end portions are bored to receive a cable of a particular diameter. The inner surface of each end portion may be stepped or tapered. The center portion of the repair sleeve, between the two end portions, has an interior diameter substantially larger than the nominal diameter of the cable so that the repair sleeve can be use on a frayed cable or a cable with a failing splice. The repair sleeve is split longitudinally into two interlocking portions, which, when separated, allows the damaged cable or failing splice under repair to be inserted into a first one of the portions in a radial direction. The other portion is then inserted into the first portion and the repair sleeve is swaged onto the cable.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
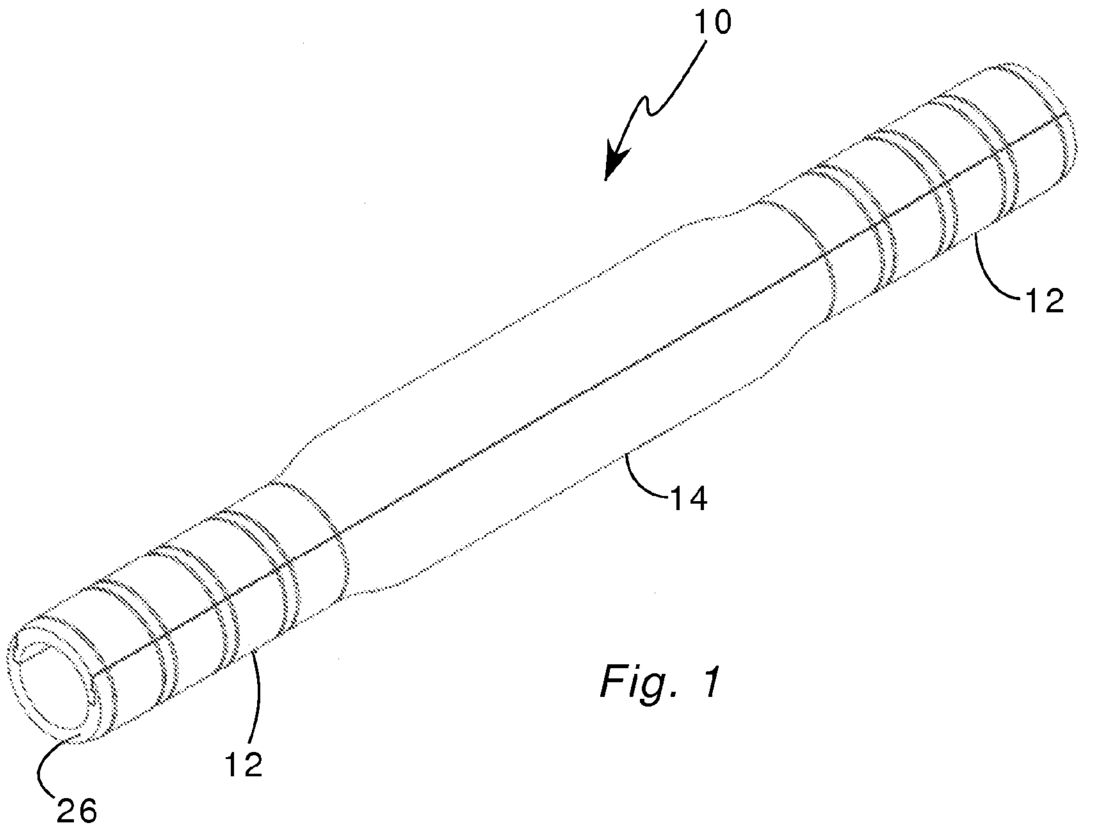
FIG. 1 is perspective view of a repair sleeve in accordance with an embodiment of the invention.
Figure 2:
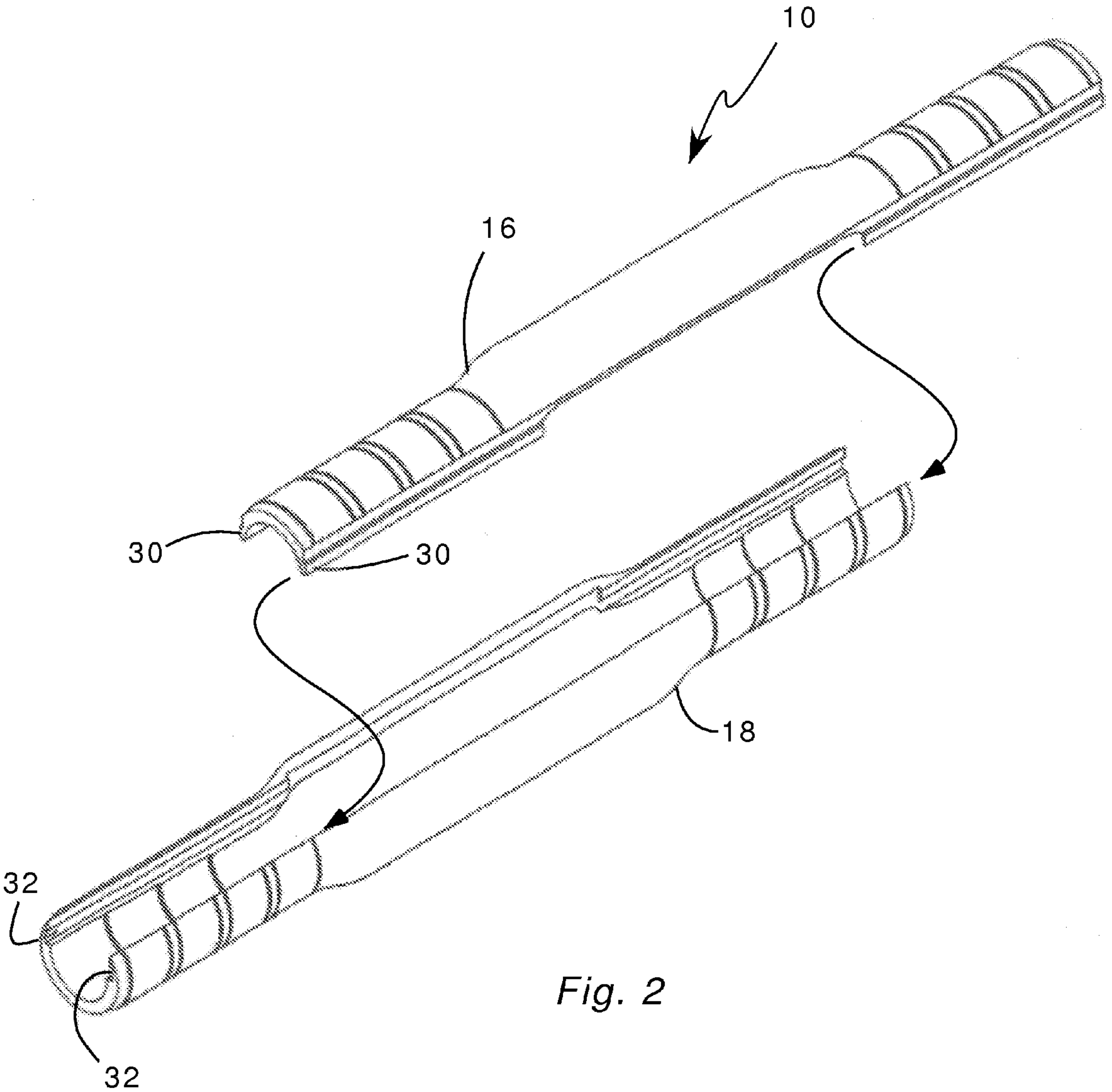
FIG. 2 is an exploded perspective view of the repair sleeve shown in FIG. 1.
Figure 3:
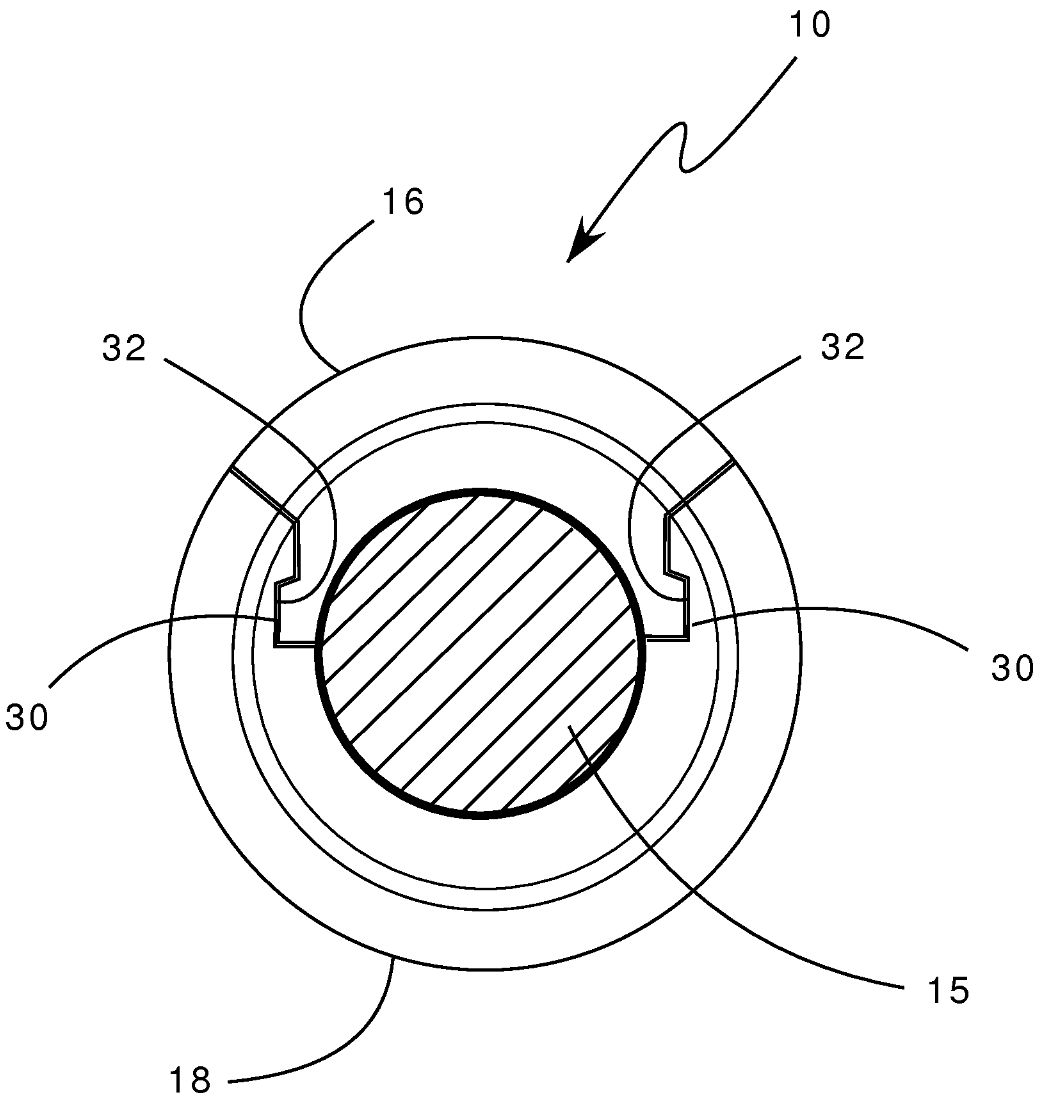
FIG. 3 is an elevation view of one end of the repair sleeve shown in FIG. 1.
Figure 4:
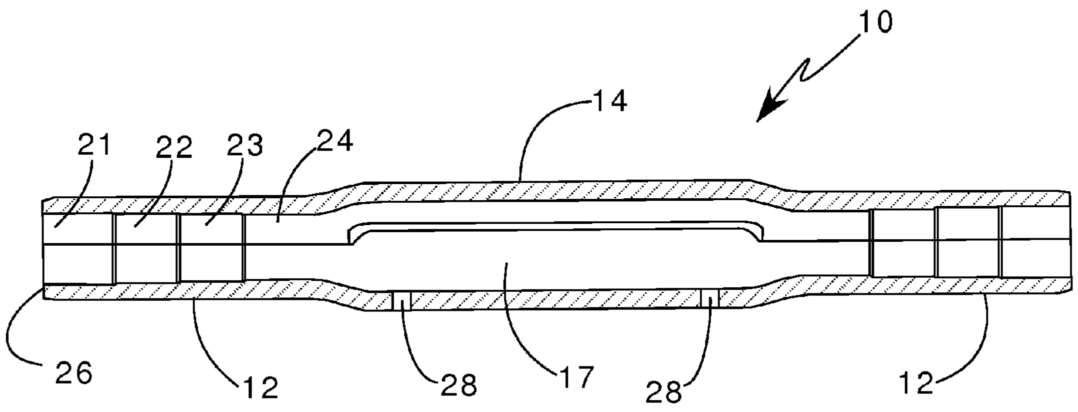
FIG. 4 is a cross-sectional view of the repair sleeve shown in FIG. 1.

A repair sleeve 10 in accordance with one embodiment of the present invention is shown in FIGS. 1-4. The repair sleeve comprises two end portions 12 and a center portion 14. The end portions are bored to receive a cable 15. As best seen in FIG. 4, the inner surface of each end portion comprises segments 21, 22, 23 and 24. Starting at the end 26 of the repair sleeve, the inner diameter of each successive segment is slightly smaller than the preceding segment. Thus, the inner diameter of segment 22 is slightly smaller than the inner diameter of segment 21, the inner diameter of segment 23 is slightly smaller than the inner diameter of segment 22 and the inner diameter of segment 24 is slightly smaller than the inner diameter of segment 23. This stepped reduction in diameter affects the compressive force securing the repair sleeve to the cable as described below. Although repair sleeve 10 is illustrated with four stepped segments in each end portion, it is to be understood that other embodiments of the invention may have more or fewer segments. This stepped configuration has also been used for a variety of full-tension swaged connectors as described in U.S. Pat. No. 7,874,881, the disclosure of which is incorporated by reference as if fully set forth herein.

As will be appreciated, the specific dimensions of repair sleeve 10 are dependent upon the dimensions of the cable 15 with which it will be used. The smallest inside diameter, in this case that of segment 24, is slightly greater than the nominal outside diameter of the cable. The inside diameter step sizes (i.e., the difference between the inner diameters of segments 21 and 22, the difference between the inner diameters of segments 22 and 23 and the difference between the inner diameters of segment 23 and 24) may be approximately 0.05 inches. The axial length of each segment is determined primarily by the dimensions of the swaging tool head (and the gaps between swages) and may be approximately 1.25 inch.

Center portion 14 defines a cavity 17 with an inner diameter that is substantially larger than the nominal diameter of cable 15 (and also substantially larger than the inner diameter of even the largest segment, i.e., segment 21) so that the repair sleeve can be easily used on a cable that is frayed. Moreover, both the inside diameter and length of the cavity 17 are designed to accommodate a cable splice so that the repair sleeve can be applied to a cable with a damaged or failing splice. The center portion is provided with weep holes 28 to allow drainage of any accumulation of water within the cavity.

The repair sleeve is split longitudinally into a first or inner portion 16 and a second or outer portion 18. Inner portion 16 has flanges 30 that are received in corresponding slots 32 in outer portion 18. These flanges and slots define keying surfaces that assist axial insertion of the inner portion into the outer portion and prevent the two portions from being separated radially. The flanges and slots may also be configured with an axial taper toward the end 26 of the repair sleeve to prevent the inner portion from sliding out of engagement with the outer portion and to temporarily wedge the two portions together prior to swaging.

To install the repair sleeve 10 onto cable 15, the outer portion 18 is placed on the cable with any frayed area or a failing splice placed in center portion 14. The inner portion 16 is then fitted to the outer portion and slid into position. The repair sleeve is compressed onto the cable using a hydraulic swaging tool. A suitable swaging tool may be, for example, the 360° Radial Swage Tool manufactured by DMC Power, Inc. of Gardena, Calif. The compressive force securing the repair sleeve to the cable is highest in segment 24, which has the smallest inner diameter, and decreases as the inner diameter of the segments increases toward the ends of the sleeve.

Figure 5:
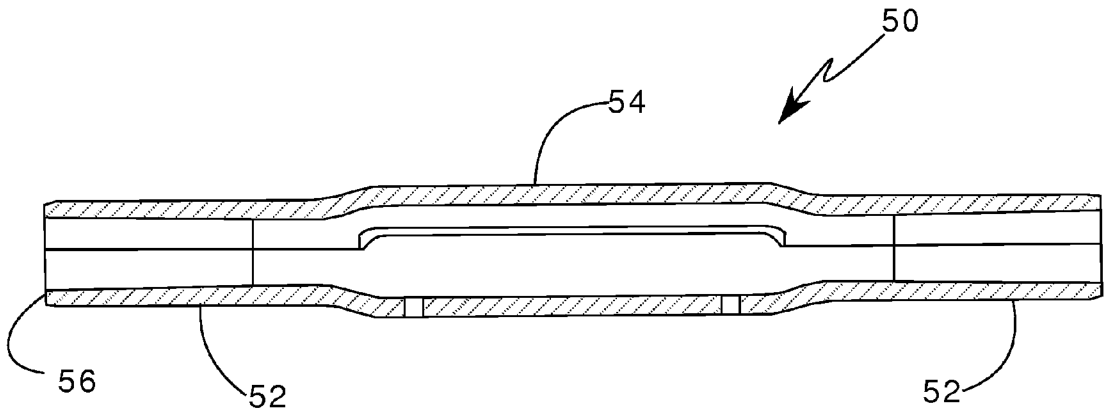
FIG. 5 is a cross-sectional view of a repair sleeve in accordance with another embodiment of the invention.

FIG. 5 is a cross-sectional view of a repair sleeve 50 in accordance with another embodiment of the invention. Repair sleeve 50 is identical in most respects to repair sleeve 10 described above, except that the inner surfaces of end portions 52 are tapered rather than stepped from an inner diameter corresponding to that of segment 24 adjacent to center portion 54 to an inner diameter corresponding to that of segment 21 adjacent to end 56.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A cable repair sleeve comprising: first and second end portions, each having a plurality of axially contiguous swaging segments and a substantially cylindrical outer surface across all of the swaging segments, each of the first and second end portions having an inner surface with each of the swaging segments having a successively decreasing inner diameter; a center portion having an interior diameter substantially larger than a largest inner diameter of either of the first and second end portions; wherein the repair sleeve is split longitudinally into two first and second interlocking portions, which, when separated, allow insertion, in a radial direction, of a cable into the first interlocking portion, and wherein the first and second interlocking portions have corresponding keying surfaces such that the second interlocking portion is axially insertable into the first interlocking portion and such that, when the second interlocking portion is axially inserted into the first interlocking portion, radial separation of the first and second interlocking portions is prevented.

2. The cable repair sleeve of claim 1 wherein the inner surface of each of the first and second end portions is stepped.

3. The cable repair sleeve of claim 1 wherein the inner surface of each of the first and second end portions is tapered.

4. A method of attaching the cable repair sleeve of claim 1 to a cable comprising: placing the first interlocking portion on the cable; placing the second interlocking portion into mating engagement with the first interlocking portion; compressing the swaging segments of the first and second end portions radially inwardly with a swaging tool.

5. The method of claim 4 wherein the first interlocking portion is placed on a cable with the center portion disposed around a frayed portion of the cable.

6. The method of claim 4 wherein the first interlocking portion is placed on a cable with the center portion disposed around a splice in the cable.

* * * * *